(12) United States Patent
Wu

(10) Patent No.: US 11,552,496 B2
(45) Date of Patent: Jan. 10, 2023

(54) VEHICLE PERMANENT MAGNET SYNCHRONOUS GENERATOR CONTROL SYSTEM

(71) Applicants: Shenzhen Geniusmart Technologies Co., Ltd., Shenzhen (CN); Jun Wu, Hong Kong (CN)

(72) Inventor: Jun Wu, Hong Kong (CN)

(73) Assignees: SHENZHEN GENIUSMART TECHNOLOGIES CO., LTD., Shenzhen (CN); Jun Wu, Hong Kong (CN)

( * ) Notice: Subject to any disclaimer, the term of this patent is extended or adjusted under 35 U.S.C. 154(b) by 119 days.

(21) Appl. No.: 17/135,899

(22) Filed: Dec. 28, 2020

(65) Prior Publication Data
US 2022/0181901 A1 Jun. 9, 2022

(30) Foreign Application Priority Data
Dec. 3, 2020 (CN) .......................... 202022894867.X

(51) Int. Cl.
*H02J 7/14* (2006.01)
*H02M 7/06* (2006.01)
*H02M 7/12* (2006.01)
*F02B 63/04* (2006.01)

(52) U.S. Cl.
CPC ............. *H02J 7/1469* (2013.01); *H02M 7/12* (2013.01); *F02B 63/042* (2013.01)

(58) Field of Classification Search
USPC ........................................................ 320/107
See application file for complete search history.

(56) References Cited

U.S. PATENT DOCUMENTS 5,510,696 A * 4/1996 Naidu .................. H02J 7/1484
322/29

FOREIGN PATENT DOCUMENTS

JP H0412640 * 1/1992

* cited by examiner

*Primary Examiner* — Toan T Vu
*Assistant Examiner* — Xuan Ly
(74) *Attorney, Agent, or Firm* — Andrew C. Cheng

(57) ABSTRACT

A permanent magnet synchronous generator control system includes a charging circuit connected between a vehicle generator winding and a battery, a controller connected with the charging circuit, and a current detection circuit for detecting a magnitude of charging current and a voltage feedback circuit for detecting a magnitude of charging voltage that are connected with the controller. The charging circuit includes a chopper circuit for chopping an AC voltage output by the vehicle generator winding and a rectifier circuit for rectifying the chopped AC voltage into a DC voltage for charging the battery. The controller is configured to control the charging circuit to adjust the magnitude of charging current or voltage based on the detection result from the current detection circuit or voltage feedback circuit, so as to maintain the stability of the charging voltage for the battery and obtain a constant power output.

18 Claims, 2 Drawing Sheets

VEHICLE PERMANENT MAGNET SYNCHRONOUS GENERATOR CONTROL SYSTEM

FIELD

The present disclosure relates to a vehicle generator control system, in particular to a vehicle permanent magnet synchronous generator control system.

BACKGROUND

Traditional automobile generators use claw-pole electrically excited generators which are widely used due to the simple structure and low cost. However, the excited generator has to rely on an external power supply to excite an excited coil for generating a magnetic field during its starting process, and can only rely on its own output voltage to work after the generator itself works. The permanent magnet synchronous generator provides a very simple solution where the magnetic field is provided by the permanent magnet and needs no external power supply, which compensates the shortcomings of the existing excited generator technology.

The current generator system adapts a constant voltage mode to charge an accumulator battery, and thus cannot control charging current, resulting in a large charging current when the accumulator battery has a low voltage and a small charging current when the battery has a high voltage, which is unfavourable for battery life.

SUMMARY

In order to solve at least one of the existing technical problems, the present disclosure provides a vehicle permanent magnet synchronous generator control system with more stable charging status and higher charging efficiency.

In one aspect, the present disclosure provides a permanent magnet synchronous generator control system including a charging circuit connected between a vehicle generator winding and a battery, a controller connected with the charging circuit, and a current detection circuit and a voltage feedback circuit that are connected with the controller, wherein the charging circuit includes a chopper circuit and a rectifier circuit, the chopper circuit is configured to chop an AC voltage output by the vehicle generator winding and output a chopped AC voltage to the rectifier circuit, and the rectifier circuit is configured to rectify the chopped AC voltage into a DC voltage and output the DC voltage to the battery for charging. The current detection circuit is configured to detect a magnitude of charging current and send the detection result to the controller such that the controller can control the charging circuit to adjust the magnitude of charging current based on the detection result from the current detection circuit. The voltage feedback circuit is configured to detect a magnitude of charging voltage and send the detection result to the controller such that the controller can control the charging circuit to adjust the magnitude of charging voltage based on the detection result from the voltage feedback circuit.

Preferably, the vehicle generator is a single-phase generator; the chopper circuit includes a three-terminal bidirectional AC switch connecting between a first output terminal of the single-phase generator and the controller; and the rectifier circuit includes a rectifier bridge connected between a first electrode of the three-terminal bidirectional AC switch, a second output terminal of the single-phase generator winding, and positive and negative terminals of the battery.

Preferably, the charging circuit further includes a zero-crossing detection circuit connected between a second electrode of the three-terminal bidirectional AC switch and a first input/output terminal of the controller, and a chopper drive circuit connected between a third electrode of the three-terminal bidirectional AC switch and a second input/output terminal of the controller.

Preferably, the vehicle generator is a two-phase generator including a first phase winding and a second phase winding; the charging circuit includes a first parallel branch connected between the first phase winding and the controller and a second parallel branch connected between the second phase winding and the controller, such that each of the parallel branches includes a first chopper circuit and a second chopper circuit connected in parallel with each other and connected to the corresponding phase winding, and a rectifier circuit connected between the first chopper circuit and second chopper circuit and the battery, the first chopper circuit and the second chopper circuit respectively includes a first three-terminal bidirectional AC switch and a second three-terminal bidirectional AC switch connected between a first output terminal of the corresponding phase winding and the controller, the rectifier circuit includes a rectifier bridge connected between first electrodes of the first and second three-terminal bidirectional AC switches, a second output terminal of the corresponding phase winding, and positive and negative terminals of the battery.

Preferably, the charging circuit further includes a zero-crossing detection circuit connected between second electrodes of the first and second three-terminal bidirectional AC switches and a first input/output terminal of the controller, and a chopper drive circuit connected between third electrodes of the first and second three-terminal bidirectional AC switches and a second input/output terminal of the controller.

Preferably, the rectifier bridge includes a first diode with a positive pole connected to the first electrode of the corresponding three-terminal bidirectional AC switch and a negative pole connected to the positive terminal of the battery, a second diode with a negative pole connected to the first electrode of the three terminal bidirectional AC switch and a positive pole connected to the negative terminal of the battery, and a third diode with a positive pole connected to the second output terminal of the corresponding winding and a negative pole connected to the positive terminal of the battery, and a fourth diode with a negative pole connected to the second output terminal of the corresponding winding and a positive pole connected to the negative terminal of the battery.

Preferably, when the charging voltage is higher than a set value, the controller controls ON-time of the three-terminal bidirectional AC switch in the chopper circuit to decrease, and when the charging voltage is less than the set value, the controller controls the ON-time of the three-terminal bidirectional AC switch in the chopper circuit to increase; and/or when the charging current decreases, the controller controls the ON-time of the three-terminal bidirectional AC switch in the chopper circuit to increase, and when the charging current increases, the controller controls the ON-time of the three-terminal bidirectional AC switch in the chopper circuit to decrease.

Preferably, the vehicle generator is a three-phase generator including a first phase winding, a second phase winding, and a second phase winding; and the chopper circuit includes a first silicon controlled rectifier connected between the first phase winding and a first input/output terminal of the controller, a second silicon controlled rectifier connected between the second phase winding and a second input/output terminal of the controller, and a third silicon controlled rectifier connected between the third phase winding and a third input/output terminal of the controller.

Preferably, the rectifier circuit includes a first diode, a second diode and a third diode connected with the first phase winding, the second phase winding and the third phase winding, respectively.

Preferably, the controller determines a trigger angle adjustment increment of the first silicon controlled rectifier, second silicon controlled rectifier and third silicon controlled rectifier based on the difference between the charging voltage and a preset voltage; when the output voltage of the three-phase generator is higher than the preset voltage, the controller controls the first silicon controlled rectifier, second silicon controlled rectifier and third silicon controlled rectifier to decrease the trigger angle adjustment increment.

Preferably, the current detection circuit includes a current detection resistor and an operational amplifier circuit matched with the current detection resistor, which are connected between the rectifier circuit and the battery, and an output terminal of the operational amplifier circuit is connected with a first data terminal of the controller; and/or the voltage feedback circuit includes a first resistor and a second resistor connected in series, a node between the first resistor and the second resistor is connected with a second data terminal of the controller, and the series branch of the first resistor and the second resistor is connected in parallel with the battery.

The present disclosure also provides a vehicle permanent magnet synchronous generator control method according to any one of embodiments of the present disclosure. The method comprises:

the current detection circuit detecting the magnitude of charging current and sending the detection result to the controller and the controller controlling the charging circuit to adjust the magnitude of charging current based on the detection result from the current detection circuit; and the voltage feedback circuit detecting the magnitude of charging voltage and sending the detection result to the controller and the controller controlling the charging circuit to adjust the magnitude of charging voltage based on the detection result from the voltage feedback circuit.

In some embodiments, the chopper circuit comprises a three-terminal bidirectional AC switch connected between the generator and the controller, and the controller controlling the charging circuit to adjust the magnitude of charging voltage based on the detection result from the voltage feedback circuit comprises:

the controller controls ON-time of the three-terminal bidirectional AC switch in the chopper circuit to decrease when the charging voltage is higher than a set value; and the controller controls the ON-time of the three-terminal bidirectional AC switch in the chopper circuit to increase when the charging voltage is less than the set value.

In some embodiments, the chopper circuit comprises a three-terminal bidirectional AC switch connected between the generator and the controller, and the controller controlling the charging circuit to adjust the magnitude of charging current based on the detection result from the current detection circuit comprises:

the controller controls the ON-time of the three-terminal bidirectional AC switch in the chopper circuit to increase when the charging current decreases; and the controller controls the ON-time of the three-terminal bidirectional AC switch in the chopper circuit to decrease when the charging current increases.

In the vehicle permanent magnet synchronous generator control system according to the embodiments of the present disclosure, by providing the current detection circuit and the voltage feedback circuit, the controller can control the charging circuit to adjust the magnitude of charging current based on the detection result from the current detection circuit, and control the charging circuit to adjust the magnitude of charging voltage based on the detection result from the voltage feedback circuit, so as to maintain the stability of the charging voltage for the battery and obtain a constant power output. By maintaining stable charging voltage and constant power output, the generator may be maintained in an effective charging state where the output voltage of the generator 10 is higher than the voltage of the battery 40, thereby improving charging efficiency of the generator.

DESCRIPTION OF THE EMBODIMENTS

Figure 1:
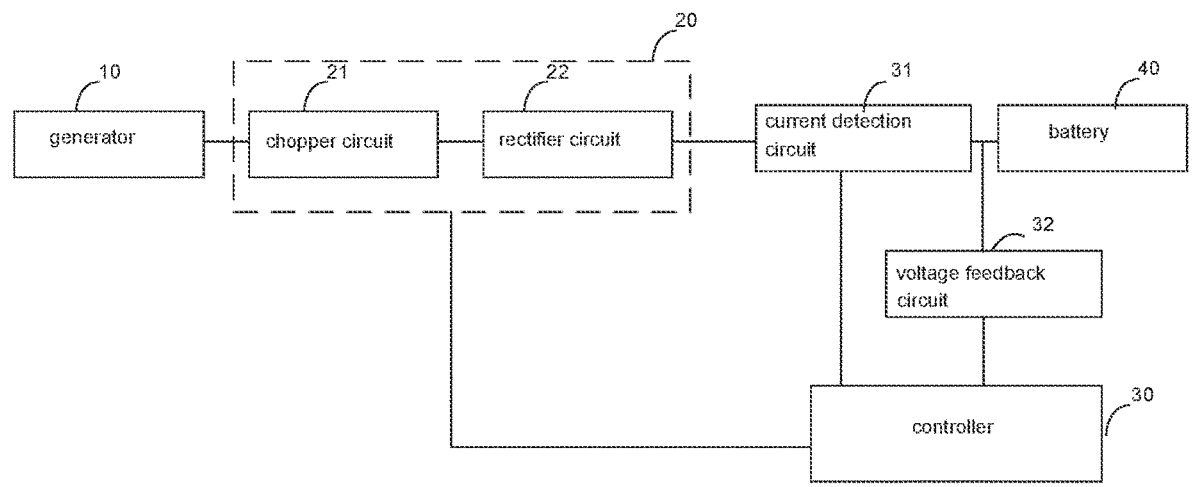
FIG. 1 is a schematic block diagram of a vehicle permanent magnet synchronous generator control system according to embodiments of the present disclosure.

Hereinafter, the technical solution of the present disclosure will be further described in details in conjunction with the drawings and the description of specific embodiments.

Unless otherwise defined, all technical and scientific terms used herein have the same meaning as commonly understood by those skilled in the technical field of the present disclosure. The terms used in the description of the present disclosure herein are only for the purpose of describing specific embodiments, and are not intended to limit the implementation of the present disclosure. The term "and/or" as used herein includes any combination and all combinations of one or more related items as listed.

In the description of the present disclosure, it should be understood that the terms "center", "upper", "lower", "front", "rear", "left", "right", "vertical", "horizontal", "top", "bottom", "inner", "outer" and other orientations or positional relationships are based on the orientations or positional relationships shown in the drawings, merely for convenience of describing the present disclosure and simplifying the description, rather than indicating or implying that the referred device or element must have such specific orientations, be constructed and operated in such specific orientations, and therefore cannot be understood as limitations of the present disclosure. In the description of the present disclosure, unless otherwise specified, "multiple" means two or more.

In the description of the present disclosure, it should be noted that, unless otherwise clearly specified and defined, the terms "install", "connect", and "couple" should be understood in a broad sense, for example, it can be a fixed connection or a detachable connection, or an integral connection; it can be a direct connection, or an indirect connection through an intermediate medium, or it can be an internal communication between two components. For those skilled in the art, specific meanings of the above-mentioned terms in the present disclosure can be understood depending on specific circumstances.

Referring to FIG. 1, a schematic block diagram of a vehicle permanent magnet synchronous generator control system according to embodiments of the present disclosure is provided. The vehicle permanent magnet synchronous generator control system includes a generator 10 and a permanent magnet synchronous generator control circuit connected between the generator 10 and a battery 40. The permanent magnet synchronous generator control circuit includes a charging circuit 20 connected with the generator 10, a controller 30 connected with the charging circuit 20, a current detection circuit 31 and a voltage feedback circuit 32 connected with the controller 30. The charging circuit 20 includes a chopper circuit 21 and a rectifier circuit 22. The chopper circuit 21 is configured to chop an AC voltage output by a winding of the generator 10 and output a chopped AC voltage to the rectifier circuit 22, and the rectifier circuit 22 is configured to rectify the chopped AC voltage into a DC voltage and outputs the DC voltage to the battery 40 for charging the battery 40. The current detection circuit 31 detects a magnitude of charging current and sends the detection result to the controller 30, and the controller 30 controls the charging circuit 20 to adjust the magnitude of charging current based on the detection result from the current detection circuit 31. The voltage feedback circuit 32 detects a magnitude of charging voltage and sends the detection result to the controller 30, and the controller 30 controls the charging circuit 20 to adjust the magnitude of charging voltage based on the detection result from the voltage feedback circuit 32. The battery 40 is a rechargeable battery, for example, an accumulator battery.

In the above embodiment, during the operating process of the vehicle permanent magnet synchronous generator, an engine of a vehicle drives the permanent magnet synchronous generator to rotate and thus generate an alternative back-EMF, which is chopped by the chopper circuit 21 and then is subjected to full wave rectification by the rectifier circuit 22 such that all negative half-cycle voltages of the chopped voltages may be used. The rectified voltage is directly supplied to the battery 40 after a voltage stabilization process. The current detection circuit 31 is configured to detect the charging current, and accordingly the controller 30 controls the charging circuit 20 to output charging current with a constant magnitude based on the magnitude of charging current detected by the current detection circuit 31. The voltage feedback circuit 32 is used to detect the charging voltage, and accordingly the controller 30 controls the charging circuit 20 to output a constant magnitude of charging voltage based on the magnitude of charging voltage detected by the voltage feedback circuit 32, so as to maintain the charging voltage of the battery 40 stable and obtain constant power output. The generator may be maintained in an effective charging state where the output voltage of the generator is higher than the voltage of the battery pack, thereby improving charging efficiency of the generator.

Figure 2:
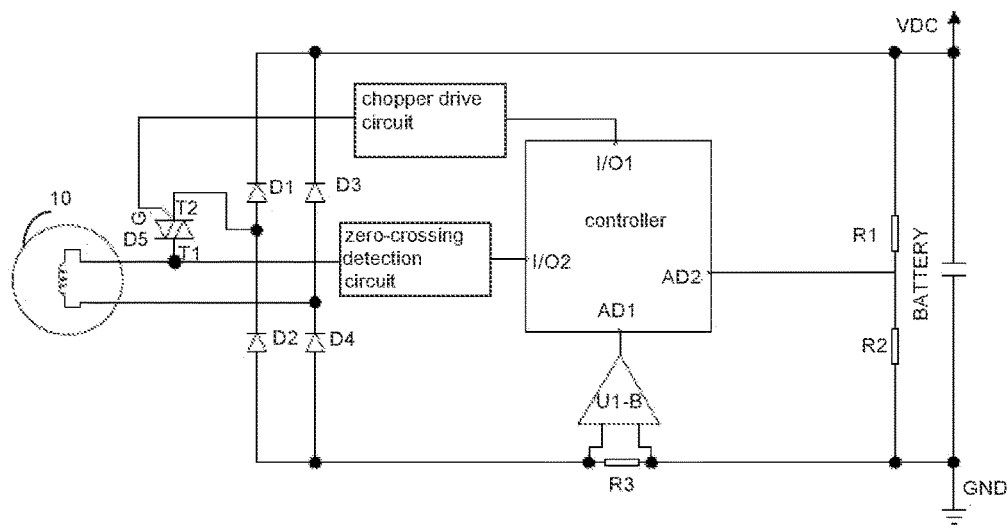
FIG. 2 is a schematic diagram of a permanent magnet synchronous generator control system according to an embodiment of the present disclosure.

Referring to FIG. 2, a schematic diagram of a permanent magnet synchronous generator control system according to an embodiment of the present disclosure is provided. The generator 10 is a vehicle single-phase generator. The chopper circuit 21 includes a three-terminal bidirectional AC switch D5 connected between a first output terminal of a single-phase generator winding and the controller 30. The rectifier circuit 22 includes a rectifier bridge connected between a first electrode T2 of the three-terminal bidirectional AC switch D5, a second output terminal of the single-phase generator winding and positive and negative terminals of the battery 40. The charging circuit 20 further includes a zero-crossing detection circuit connected between a second electrode T1 of the three-terminal bidirectional AC switch D5 and a second input/output terminal I/O2 of the controller 30, and a chopper driving circuit connected between a third electrode G of the three-terminal bidirectional AC switch D5 and a first input/output terminal I/O1 of the controller 30. The three-terminal bidirectional AC switch D5 may be a bidirectional thyristor, which is made of a semiconductor material consisting of five layers in N-P-N-P-N sequence, and also has three electrodes led to the outside. The bidirectional thyristor is equivalent to two unidirectional thyristors that are anti-paralleled to form a common control electrode. In this embodiment, the control electrode of the bidirectional thyristor is connected to the first output terminal of the generator winding. The bidirectional thyristor is coupled to the first input/output terminal I/O1 of the controller 30 via the chopper drive circuit. The zero-crossing detection circuit is used to detect when the three-terminal bidirectional AC switch D5 is crossing zero point to provide a time reference for ON/OFF of the three-terminal bidirectional AC switch D5. The chopper drive circuit is configured to control the ON/OFF of the three-terminal bidirectional AC switch D5, so as to accordingly control ON/OFF time of the three-terminal bidirectional AC switch D5.

The controller 30 controls the charging circuit 20 to adjust the magnitude of charging voltage based on the detection result from the voltage feedback circuit 32. Specifically, when the charging voltage is higher than a set value, the controller 30 may control the ON-time of the three-terminal bidirectional AC switch D5 in the chopper circuit 21 to decrease; and when the charging voltage is lower than the set value, the controller 30 may control the ON-time of the three-terminal bidirectional AC switch D5 in the chopper circuit 21 to increase. When the charging voltage is lower than the set value, the ON-time of the three-terminal AC switch D5 increases, such that the voltage may be increased accordingly so as to maintain the charging voltage for the battery 40 constant. On the contrary, when the charging voltage is higher than the set value, the ON-time of the three-terminal bidirectional AC switch D5 decreases, such that the voltage may be decreased accordingly so as to maintain the charging voltage constant. The controller 30 controls the charging circuit 20 to adjust the magnitude of charging current based on the detection result from the current detection circuit 31. Specifically, when the charging current decreases, the controller 30 may control the On-time of the three-terminal bidirectional AC switch D5 in the chopper circuit 21 to increase; and when the charging current increases, the controller 30 may control the ON-time of the three-terminal bidirectional AC switch D5 in the chopper circuit 21 to decrease. When the charging current decreases, controlling the ON-time of the three-terminal bidirectional AC switch D5 to increase may make the charging current increase accordingly so as to maintain the charging power output to the battery 40 constant. When the charging current increases, controlling the ON-time of the bidirectional AC switch D5 to decrease may make the charging current decrease accordingly so as to maintain the charging power output to the battery 40 constant. By maintaining stable charging voltage and constant power output, the generator may be maintained in an effective state where the output voltage of the generator 10 is higher than the voltage of the battery 40, thereby improving charging efficiency of the generator.

In some embodiments, the rectifier bridge includes a first diode D1 with a positive pole connected to the first electrode T2 of the corresponding three-terminal bidirectional AC switch D5 and a negative pole connected to the positive terminal of the battery 40, a second diode D2 with a negative pole connected to the first electrode T2 of the three terminal bidirectional AC switch D5 and a positive pole connected to the negative terminal of the battery 40, and a third diode D3 with a positive pole connected to the second input terminal of the corresponding wind and a negative pole connected to the positive terminal of the battery 40, and a fourth diode D4 with a negative pole connected to the second output terminal of the corresponding winding and a positive pole connected to the negative terminal of the battery 40. With the rectifier bridge composed of the first diode D1, second diode D2, third diode D3 and fourth diode D4, the output AC voltage, which has been chopped by the chopper circuit 21, can be rectified into a DC voltage so as to charge the battery 40.

In some embodiments, the current detection circuit 31 includes a current detection resistor R3 connected between the rectifier circuit 22 and the battery 40 and an operational amplifier circuit U1-B connected in parallel with the current detection resistor R3, with an output terminal of the operational amplifier circuit U1-B connected with a first data terminal AD1 of the controller 30. The voltage feedback circuit 32 includes a first resistor R1 and a second resistor R2 that are connected in series, such that a node between the first resistor R1 and the second resistor R2 is connected with a second data terminal AD2 of the controller 30, and the series branch of the first resistor R1 and the second resistor R2 is connected in parallel with the battery 40. The current detection circuit 31 calculates the magnitude of the current flowing through the current detection resistor R3 based on resistance values of the operational amplifier circuit U1-B and the current detection resistor R3, so as to detect the magnitude of charging current. The voltage detection circuit 31 calculates the voltage values between opposite ends of the series branch of the first resistor R1 and the second resistor R2 based on the magnitude of the voltage at the node between the first resistor R1 and the second resistor R2, and a ratio of the first resistor R1 to the second resistor R2, so as to detect the magnitude of charging voltage.

In the single-phase permanent magnet synchronous generator of the above-mentioned embodiments according to the present disclosure, the corresponding winding of the generator is connected with the chopper circuit 21 and the rectifier circuit 22, such that by setting the current detection circuit 31 and the voltage feedback circuit 32, the controller 30 can control the charging circuit 20 to adjust the magnitude of the charging current based on the detection result from the current detection circuit 31, and controls the charging circuit 20 to adjust the magnitude of the charging voltage based on the detection result from the voltage feedback circuit 32, to maintain the charging voltage output to the battery 40 stable, and achieve a constant power output, such that the generator may maintain in an effective charging state where the output voltage of the generator is higher than the voltage of the battery, thereby improving the charging efficiency of the generator.

Figure 3:
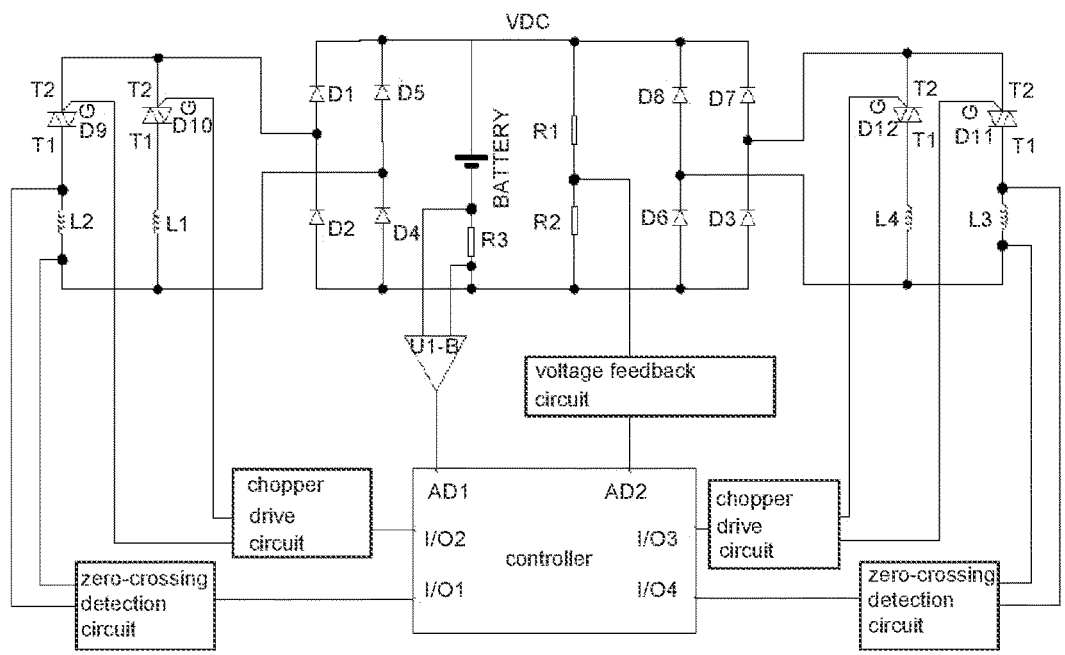
FIG. 3 is a schematic diagram of a permanent magnet synchronous generator control system according to another embodiment of the present disclosure.

Referring to FIG. 3, a schematic diagram of a permanent magnet synchronous generator control system according to another embodiment of the present disclosure is provided. The difference of this embodiment from that shown in FIG. 2 is in that the vehicle generator is a two-phase generator in this embodiment. The two-phase generator includes a first phase winding and a second phase winding. The charging circuit 20 includes a first parallel branch connected between the first phase winding and the controller 30, and a second parallel branch connected between the second phase winding and the controller 30. Each of the parallel branches includes first and second chopper circuits that are connected in parallel with each other and are connected to the corresponding phase winding, and a rectifier circuit 22 between the first and second chopper circuits and the battery 40. The first chopper circuit includes a first three-terminal bidirectional AC switch connected between a first output terminal of the corresponding phase winding and the controller 30, and the second chopper circuit includes a second three-terminal bidirectional AC switch connected between the first output terminal of the corresponding phase winding and the controller 30. The rectifier circuit 22 includes a rectifier bridge connected to first electrodes T2 of the first and second three-terminal bidirectional AC switches, a second output terminal of the corresponding phase winding and positive and negative terminals of the battery 40. Also, the charging circuit 20 includes a zero-crossing detection circuit between second electrodes T1 of the first and second three-terminal AC switches and a first input/output terminal of the controller 30, and a chopper drive circuit connected between third electrodes G of the first and second three-terminal bidirectional AC switches and a second input/output terminal of the controller 30. Taking the embodiment shown in FIG. 3 as an example, the first phase winding includes windings L1 and L2, and the three-terminal bidirectional AC switches correspondingly connected with the windings L1 and L2 are respectively defined as the first three-terminal bidirectional AC switch D9 and the second three-terminal bidirectional AC switch D10; and the second phase winding includes windings L3 and L4, and the three-terminal bidirectional AC switches correspondingly connected with the windings L3 and L4 are respectively defined as the first three-terminal bidirectional AC switch D11 and the second three-terminal bidirectional AC switch D12.

In the above embodiment, the first phase winding and second phase winding of the two-phase permanent magnet synchronous generator respectively include two windings connected in parallel. The phase difference between the first phase winding and the second phase winding is 90 degrees, and each winding is connected in series with one corresponding three-terminal bidirectional AC switch to perform chopping control. The chopped voltages are respectively rectified by the rectifier bridge connected to the corresponding phases and stabilized and then fed to the battery 40. Each phase of the two-phase generator adopts two chopper circuits 21, thereby increasing the power of each single phase.

Figure 4:
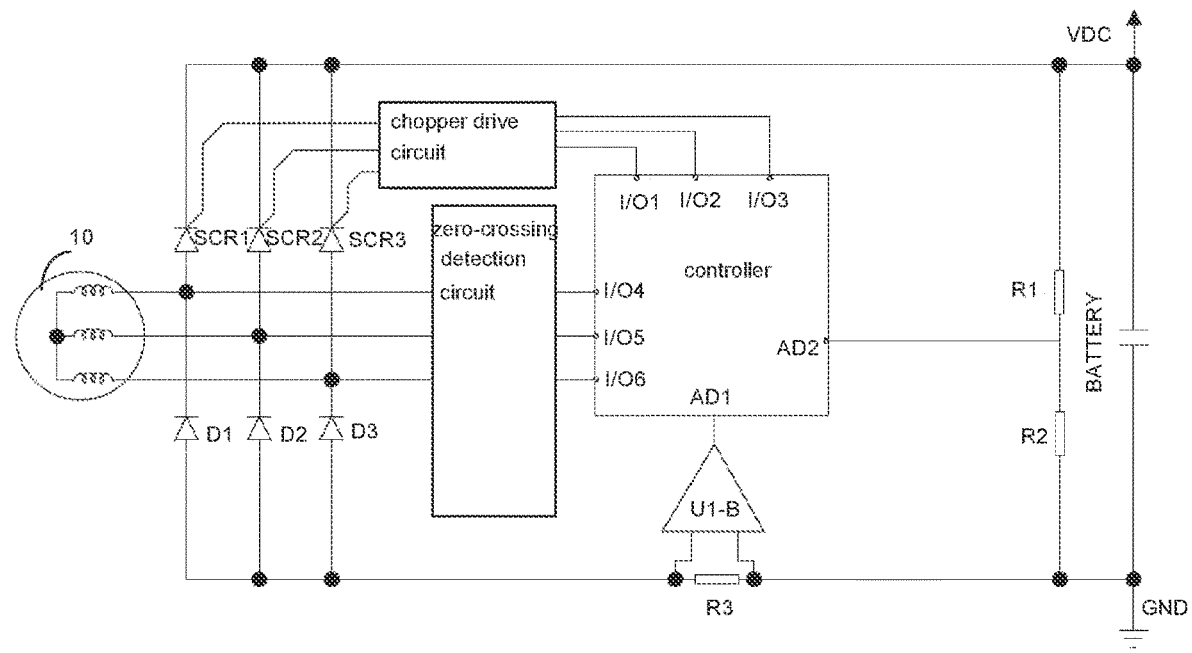
FIG. 4 is a schematic diagram of a permanent magnet synchronous generator control system according to yet another embodiment of the present disclosure.

Referring to FIG. 4, a schematic diagram of a permanent magnet synchronous generator control system according to yet another embodiment of the present disclosure is provided. The difference of this embodiment from that shown in FIG. 2 is in that the generator 10 is a vehicle three-phase generator. The three-phase generator includes a first phase winding, a second phase winding, and a third phase winding. The chopper circuit 21 includes a first silicon controlled rectifier SCR1 connected between the first phase winding and a first input/output terminal I/O1 of the controller, a second silicon controlled rectifier SCR2 connected between the second phase winding and a second input/output terminal I/O2 of the controller, and a third silicon controlled rectifier SCR3 connected between the third phase winding and a third input/output terminal I/O3 of the controller.

The rectifier circuit 22 includes a first diode D1 with a negative pole connected to the first phase winding and a positive pole connected to the negative terminal of the battery 40; a second diode D2 with a negative pole connected to the second phase winding and a positive pole connected to the negative terminal of the battery 40; and a third diode D3 with a negative pole connected to the third phase winding and a positive pole connected to the negative terminal of the battery 40. Specifically, the negative pole of the first diode D1 is connected to a node between the first phase winding and the first silicon controlled rectifier SCR1, the negative pole of the second diode D2 is connected to a node between the second phase winding the second silicon controlled rectifier SCR2, and the negative pole of the third diode D3 is connected to a node between the third phase winding and the third silicon controlled rectifier SCR3. The chopper drive circuit is connected between negative electrodes of the first, second and third silicon controlled rectifiers SCR1, SCR2 and SCR3 and the first, second, third input and output terminals I/O1, I/O2 and I/O3. The zero-crossing detection circuit is connected between positive electrodes of the first, second and third silicon controlled rectifiers SCR1, SCR2 and SCR3 and fourth, fifth and sixth input/output terminal I/O4, I/O5 and I/O6 of the controller 30.

In the above-mentioned embodiment, the phase difference between every two phase windings of the first, second and third phase windings of the three-phase permanent magnet synchronous generator is 120 degrees, and each winding is connected in series with a corresponding silicon controlled rectifier SCR, which has the advantages of small size, light weight, high efficiency, long life and convenient control, to perform chopping control, thereby simplifying the circuit structure of the three-phase generator by saving one diode for each phase of the three-phase winding and thus reducing the number of diodes. Secondly, with one chopper drive circuit connected to all chopper devices respectively connected with the three phase windings, the chopper drive circuit synchronously drives the multiple chopper devices in the chopper circuit 21 to turn ON or OFF, thereby simplifying the circuit structure and saving the circuit cost.

The permanent magnet synchronous generator control system according to the above-mentioned embodiments of the present disclosure adopts a voltage and current closed-loop control algorithm based on a microcontroller to adjust the conduction angle of the silicon controlled rectifier, such that the generator can provide constant voltage and constant current output in a wide speed range and under a full load condition. Compared with the method in which the excited motor controls the excited magnetic field by controlling the excited current, the control method of the present disclosure is more flexible, simple and reliable and has a fast response speed and a wide practical range.

The present disclosure provides a charging current control strategy that can control the charging current in real time and can ensure that the battery is charged under the most favorable conditions, thereby improving charging efficiency.

The above are only specific embodiments of the present disclosure, but the protection scope of the present disclosure is not limited to this. Those skilled in the art can easily envisage changes or replacements within the technical scope disclosed by the present disclosure, which shall be covered within the protection scope of the present disclosure. Therefore, the protection scope of the present disclosure should be defined by the protection scope of the claims.

What is claimed is:

1. A permanent magnet synchronous generator control system, comprising:
    a charging circuit connected between a vehicle generator winding and a rechargeable battery, the charging circuit comprising a chopper circuit and a rectifier circuit, the chopper circuit being configured to chop an AC voltage output by the vehicle generator winding and output a chopped AC voltage to the rectifier circuit, the rectifier circuit being configured to rectify the chopped AC voltage into a DC voltage and output the DC voltage to the rechargeable battery;
    a controller connected with the charging circuit;
    a current detection circuit connected between the charging circuit and the rechargeable battery and configured to detect a magnitude of charging current output from the charging circuit to the rechargeable battery and send a detection result to the controller such that the controller is capable of controlling the charging circuit to adjust the magnitude of charging current based on the detection result from the current detection circuit; and
    a voltage feedback circuit connected with the controller and configured to detect a magnitude of charging voltage and send the detection result to the controller such that the controller is capable of controlling the charging circuit to adjust the magnitude of charging voltage based on the detection result from the voltage feedback circuit,
    wherein the vehicle generator is a single-phase generator; the chopper circuit comprises a three-terminal bidirectional AC switch connected between a first output terminal of the single-phase generator and the controller; and the rectifier circuit comprises a rectifier bridge connected between a first electrode of the three-terminal bidirectional AC switch, a second output terminal of the single-phase generator winding, and positive and negative terminals of the battery.

2. The permanent magnet synchronous generator control system according to claim 1, wherein the charging circuit further comprises a zero-crossing detection circuit connected between a second electrode of the three-terminal bidirectional AC switch and a first input/output terminal of the controller, and a chopper drive circuit connected between a third electrode of the three-terminal bidirectional AC switch and a second input/output terminal of the controller.

3. The permanent magnet synchronous generator control system according to claim 1, wherein the rectifier bridge comprises a first diode with a positive pole connected to the first electrode of the three-terminal bidirectional AC switch and a negative pole connected to the positive terminal of the rechargeable battery, a second diode with a negative pole connected to the first electrode of the three terminal bidirectional AC switch and a positive pole connected to the negative terminal of the rechargeable battery, and a third diode with a positive pole connected to the second output terminal of the winding and a negative pole connected to the positive terminal of the rechargeable battery, and a fourth diode with a negative pole connected to the second output terminal of the winding and a positive pole connected to the negative terminal of the rechargeable battery.

4. A permanent magnet synchronous generator control system comprising:
    a charging circuit connected between a vehicle generator winding and a rechargeable battery, the charging circuit comprising a chopper circuit and a rectifier circuit, the chopper circuit being configured to chop an AC voltage output by the vehicle generator winding and output a chopped AC voltage to the rectifier circuit, the rectifier circuit being configured to rectify the chopped AC voltage into a DC voltage and output the DC voltage to the rechargeable battery;

a controller connected with the charging circuit;

a current detection circuit connected between the charging circuit and the rechargeable battery and configured to detect a magnitude of Charging current output from the charging circuit to the rechargeable battery and send a detection result to the controller such that the controller is capable of controlling the charging circuit to adjust the magnitude of charging current based on the detection result from the current detection circuit; and a voltage feedback circuit connected with the controller and configured to detect a magnitude of charging voltage and send the detection result to the controller such that the controller is capable of controlling the charging circuit to adjust the magnitude of charging voltage based on the detection result from the voltage feedback circuit;

wherein the vehicle generator is a two-phase generator which comprises a first phase winding and a second phase winding;

the charging circuit comprises a first parallel branch connected between the first phase winding and the controller and a second parallel branch connected between the second phase winding and the controller; and each of the parallel branches comprises a first chopper circuit and a second chopper circuit connected in parallel with each other and respectively connected to a corresponding phase winding, and a rectifier circuit connected between the first chopper circuit and second chopper circuit and the rechargeable battery.

5. The permanent magnet synchronous generator control system according to claim 4, wherein the first chopper circuit comprises a first three-terminal bidirectional AC switch connected between a first output terminal of the corresponding phase winding and the controller;

the second chopper circuit comprises a second three-terminal bidirectional AC switch connected between the first output terminal of the corresponding phase winding and the controller;

the first three-terminal bidirectional AC switch comprises a first electrode, a second electrode connected to a first output terminal of the corresponding phase winding, and a third electrode; and the second three-terminal bidirectional AC switch comprises a first electrode, a second electrode connected to a first output terminal of the corresponding phase winding, and a third electrode.

6. The permanent magnet synchronous generator control system according to claim 5, wherein the charging circuit further comprises a zero-crossing detection circuit connected between the second electrodes of the first and second three-terminal bidirectional AC switches and a first input/output terminal of the controller, and a chopper drive circuit connected between the third electrodes of the first and second three-terminal bidirectional AC switches and a second input/output terminal of the controller.

7. The permanent magnet synchronous generator control system according to claim 5, wherein the rectifier circuit comprises a rectifier bridge connected between the first electrodes of the first and second three-terminal bidirectional AC switches, second output terminals of the corresponding phase windings, and positive and negative terminals of the rechargeable battery.

8. The permanent magnet synchronous generator control system according to claim 7, wherein the rectifier bridge comprises a first diode with a positive pole connected to the first electrodes of the first and second three-terminal bidirectional AC switches and a negative pole connected to the positive terminal of the rechargeable battery, a second diode with a negative pole connected to the first electrodes of the first and second three-terminal bidirectional AC switches and a positive pole connected to the negative terminal of the rechargeable battery, and a third diode with a positive pole connected to the second output terminals of the corresponding windings and a negative pole connected to the positive terminal of the rechargeable battery, and a fourth diode with a negative pole connected to the second output terminals of the corresponding windings and a positive pole connected to the negative terminal of the rechargeable battery.

9. The permanent magnet synchronous generator control system according to claim 8, wherein when the charging voltage is higher than a set value, the controller controls ON-time of the three-terminal bidirectional AC switches in the chopper circuit to decrease; and when the charging voltage is less than the set value, the controller controls the ON-time of the three-terminal bidirectional AC switches in the chopper circuit to increase.

10. The permanent magnet synchronous generator control system according to claim 8, wherein when the charging current decreases, the controller controls the ON-time of the three-terminal bidirectional AC switches in the chopper circuit to increase; and when the charging current increases, the controller controls the ON-time of the three-terminal bidirectional AC switches in the chopper circuit to decrease.

11. A permanent magnet synchronous generator control system comprising:

a charging circuit connected between a vehicle generator winding and a rechargeable battery, the charging circuit comprising a chopper circuit and a rectifier circuit, the chopper circuit being configured to chop an AC voltage output by the vehicle generator winding and output a chopped AC voltage to the rectifier circuit, the rectifier circuit being configured to rectify the chopped AC voltage into a DC voltage and output the DC voltage to the rechargeable battery;

a controller connected with the charging circuit;

a current detection circuit connected between the charging circuit and the rechargeable battery and configured to detect a magnitude of charging current output from the charging circuit to the rechargeable battery and send a detection result to the controller such that the controller is capable of controlling the charging circuit to adjust the magnitude of charging current based on the detection result from the current detection circuit; and a voltage feedback circuit connected with the controller and configured to detect a magnitude of charging voltage and send the detection result to the controller such that the controller is capable of controlling the charging circuit to adjust the magnitude of charging voltage based on the detection result from the voltage feedback circuit;

wherein the vehicle generator is a three-phase generator comprising a first phase winding, a second phase winding, and a second phase winding; and the chopper circuit comprises a first silicon controlled rectifier connected between the first phase winding and a first input/output terminal of the controller, a second silicon controlled rectifier connected between the second phase winding and a second input/output terminal of the controller, and a third silicon controlled rectifier connected between the third phase winding and a third input/output terminal of the controller.

12. The permanent magnet synchronous generator control system according to claim 11, wherein the rectifier circuit comprises a first diode, a second diode and a third diode connected with the first phase winding, the second phase winding and the third phase winding, respectively.

13. The permanent magnet synchronous generator control system according to claim 12, wherein the controller is configured to determine a trigger angle adjustment increment of the first silicon controlled rectifier, second silicon controlled rectifier and third silicon controlled rectifier based on difference between the charging voltage and a preset voltage.

14. The permanent magnet synchronous generator control system according to claim 13, wherein when the output voltage of the three-phase generator is higher than the preset voltage, the controller controls the first silicon controlled rectifier, second silicon controlled rectifier and third silicon controlled rectifier to decrease the trigger angle adjustment increment.

15. The permanent magnet synchronous generator control system according to claim 1, wherein the current detection circuit comprises a current detection resistor and an operational amplifier circuit matched with the current detection resistor, which are connected between the rectifier circuit and the rechargeable battery, and an output terminal of the operational amplifier circuit is connected with a first data terminal of the controller.

16. The permanent magnet synchronous generator control system according to claim 1, wherein the voltage feedback circuit comprises a first resistor and a second resistor connected in series, a node between the first resistor and the second resistor is connected with a second data terminal of the controller, and a branch circuit comprising the first resistor and the second resistor is connected in parallel with the battery.

17. A method for controlling the permanent magnet synchronous generator control system of claim 1, comprising:
the current detection circuit detecting the magnitude of charging current and sending the detection result to the controller and the controller controlling the charging circuit to adjust the magnitude of charging current based on the detection result from the current detection circuit; and
the voltage feedback circuit detecting the magnitude of charging voltage and sending the detection result to the controller and the controller controlling the charging circuit to adjust the magnitude of charging voltage based on the detection result from the voltage feedback circuit,
wherein the chopper circuit comprises a three-terminal bidirectional AC switch connected between the generator and the controller, and the controller controlling the charging circuit to adjust the magnitude of charging current based on the detection result from the current detection circuit comprises:
the controller controls the ON-time of the three-terminal bidirectional AC switch in the chopper circuit to increase when the charging current decreases; and
the controller controls the ON-time of the three-terminal bidirectional AC switch in the chopper circuit to decrease when the charging current increases.

18. The controlling method of claim 17, wherein the chopper circuit comprises a three-terminal bidirectional AC switch connected between the generator and the controller, and the controller controlling the charging circuit to adjust the magnitude of charging voltage based on the detection result from the voltage feedback circuit comprises:
the controller controls ON-time of the three-terminal bidirectional AC switch in the chopper circuit to decrease when the charging voltage is higher than a set value; and
the controller controls the ON-time of the three-terminal bidirectional AC switch in the chopper circuit to increase when the charging voltage is less than the set value.

\* \* \* \* \*